US009325268B2

(12) United States Patent
Styhm et al.

(10) Patent No.: US 9,325,268 B2
(45) Date of Patent: Apr. 26, 2016

(54) POWER DISSIPATING ARRANGEMENT IN A WIND TURBINE

(75) Inventors: Ove Styhm, Hadsten (DK); Anshuman Tripathi, Singapore (SG); Amit Kumar Gupta, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 77 days.

(21) Appl. No.: 14/233,164

(22) PCT Filed: Jul. 24, 2012

(86) PCT No.: PCT/DK2012/050278
§ 371 (c)(1),
(2), (4) Date: Apr. 8, 2014

(87) PCT Pub. No.: WO2013/013678
PCT Pub. Date: Jan. 31, 2013

(65) Prior Publication Data
US 2014/0217730 A1 Aug. 7, 2014

Related U.S. Application Data

(60) Provisional application No. 61/512,436, filed on Jul. 28, 2011.

(30) Foreign Application Priority Data

Jul. 27, 2011 (DK) .................................. 2011 70410

(51) Int. Cl.
*H02P 9/00* (2006.01)
*F03D 7/04* (2006.01)
(Continued)

(52) U.S. Cl.
CPC .. *H02P 9/00* (2013.01); *F03D 7/04* (2013.01); *H02P 3/22* (2013.01); *H02P 9/006* (2013.01); *H02P 2101/15* (2015.01)

(58) Field of Classification Search
CPC ............. H02P 3/22; H02P 9/006; H02P 9/00; F03D 7/04
See application file for complete search history.

(56) References Cited

U.S. PATENT DOCUMENTS

| 4,511,807 | A * | 4/1985 | Somerville | 290/44 |
| 8,692,523 | B2 * | 4/2014 | Drobnjak et al. | 322/44 |

(Continued)

FOREIGN PATENT DOCUMENTS

| EP | 1863162 A2 | 12/2007 |
| EP | 2270331 A2 | 1/2011 |
| WO | 2010023127 A2 | 3/2010 |

OTHER PUBLICATIONS

Danish Search Report for application No. PA 2011 70410, Mar. 5, 2012.

(Continued)

*Primary Examiner* — Tulsidas C Patel
*Assistant Examiner* — Viet Nguyen
(74) *Attorney, Agent, or Firm* — Patterson & Sheridan, LLP (57) ABSTRACT

A power dissipating arrangement for dissipating power from a generator in a wind turbine is provided. The generator comprises a plurality of output terminals corresponding to a multi-phase output. The power dissipating arrangement comprises a plurality of dissipating units, a plurality of semiconductor switches, a trigger circuit for switching the semiconductor switches and a control unit for controlling the operation of the trigger circuit, thereby controlling the switching of the semiconductor switches. Each dissipating unit includes a first terminal and a second terminal. The first terminal of each dissipating unit is coupled to each output terminal of the generator. Each semiconductor switch includes a first terminal anode, a second terminal and a gate terminal. The first terminal of each semiconductor switch is coupled to the second terminal of each dissipating unit and the second terminal of the semiconductor switch is coupled to the second terminal of another dissipating unit, such that the second terminal of each dissipating unit is coupled to the first terminal of one semiconductor switch and the second terminal of another semiconductor switch. The trigger circuit is coupled to the gate terminal of the plurality of the semiconductor switches for switching the semiconductor switches.

15 Claims, 3 Drawing Sheets

(51) Int. Cl.
  *H02P 3/22* (2006.01)
  *H02P 101/15* (2015.01)

(56) References Cited

U.S. PATENT DOCUMENTS

| | | | |
|---|---|---|---|
| 2007/0164567 A1* | 7/2007 | Luetze et al. | 290/44 |
| 2007/0279815 A1* | 12/2007 | Li et al. | 361/54 |
| 2010/0133823 A1 | 6/2010 | Schramm et al. | |
| 2010/0314875 A1* | 12/2010 | Grant | 290/44 |
| 2011/0025059 A1* | 2/2011 | Helle et al. | 290/44 |
| 2011/0163702 A1* | 7/2011 | Dommaschk et al. | 318/376 |
| 2011/0170218 A1* | 7/2011 | Claude et al. | 361/30 |
| 2012/0217824 A1* | 8/2012 | Gupta et al. | 307/145 |
| 2013/0033268 A1* | 2/2013 | Parkhou et al. | 324/511 |

OTHER PUBLICATIONS

International Search Report for PCT/DK2012/050278, Sep. 9, 2013.

* cited by examiner

POWER DISSIPATING ARRANGEMENT IN A WIND TURBINE

FIELD OF THE INVENTION

The present invention relates generally to a power dissipating arrangement, and in particular, to a power dissipating arrangement for use in a wind turbine.

BACKGROUND OF THE INVENTION

A wind turbine is an energy conversion system which converts kinetic wind energy into electrical energy for utility power grids. Specifically, wind incident on blades of the wind turbine generator (WTG) causes a rotor of the WTG to rotate. The mechanical energy of the rotating rotor in turn is converted into electrical energy by an electrical generator. One type of wind turbine that provides constant frequency electrical power is a fixed-speed wind turbine. This type of wind turbine requires a generator rotor that rotates at a constant speed. Another type of wind turbine is a variable speed wind turbine. This type of wind turbine allows the generator to rotate at variable speeds to accommodate for fluctuating wind speeds.

A full scale power converter based wind turbine (which is a type of variable speed wind turbine) usually includes a power converter having a generator side converter coupled to a grid side converter via a direct current (DC) link. The generator side converter regulates the power of the generator. This power passes through the DC-link, and is eventually fed to the grid through the grid side converter and other power components. The grid side converter regulates the grid side power. The same is true for the Doubly Fed Induction Generator (DFIG) systems where only a portion of the power from the generator may pass through the power converter.

A wind turbine may be requested to shut down, for example due to an extreme fault in the grid, component failure in the turbine/wind farm or requested by the grid operator. A power dissipating unit is usually applied to the generator windings to dissipate the power from the generator during shut down. This ensures that when there is a sudden loss of power, there is no significant change in the shaft torque.

The activation of the dissipating unit to dissipate power from the generator is usually controlled by power switches and control circuits. In order for the wind turbine to shut down properly and safely, it is crucial that the dissipating unit, the associated switches and the control circuits are reliable. If any one of the components is faulty, it should be easily detectable in order to ensure that the drive train health is not compromised.

Hence it is desirable to provide a power dissipating arrangement which has a higher reliability compared to the existing state of the art.

SUMMARY OF THE INVENTION

According to a first aspect of the invention, a power dissipating arrangement for dissipating power from a generator in a wind turbine is provided. The generator comprises a plurality of output terminals corresponding to a multi-phase output. The power dissipating arrangement comprises a plurality of dissipating units, a plurality of semiconductor switches, a trigger circuit for switching the semiconductor switches and a control unit for controlling the operation of the trigger circuit, thereby controlling the switching of the semiconductor switches.

Each dissipating unit includes a first terminal and a second terminal. The first terminal of each dissipating unit is coupled to each output terminal of the generator. Each semiconductor switch includes a first terminal, a second terminal and a gate terminal. The first terminal of each semiconductor switch is coupled to the second terminal of each dissipating unit and the second terminal of the semiconductor switch is coupled to the second terminal of another dissipating unit, such that the second terminal of each dissipating unit is coupled to the first terminal of one semiconductor switch and the second terminal of another semiconductor switch. The trigger circuit is coupled to the gate terminals of the plurality of the semiconductor switches for switching the semiconductor switches.

According to a second aspect of the invention, a power dissipating arrangement for dissipating power from a generator in a wind turbine is provided. The generator comprises a first, second and third output terminal corresponding to a three-phase output. The power dissipating arrangement comprises a first, second and third dissipating unit, a first, second and third semiconductor switch, a trigger circuit for switching the semiconductor switches, and a control unit for controlling the operation of the trigger circuit, thereby controlling the switching of the semiconductor switches.

Each of the first, second and third dissipating unit has a first terminal and a second terminal. The first terminal of the first dissipating unit is coupled to the first output terminal of the generator, the first terminal of the second dissipating unit is coupled to the second output terminal of the generator, and the first terminal of the third dissipating unit is coupled to the third output terminal of the generator.

Each of the first, second and third semiconductor switch has a first terminal, a second terminal and a gate terminal. The first terminal of the first semiconductor switch is coupled to the second terminal of the first dissipating unit and the second terminal of the first semiconductor switch is coupled to the second terminal of the second dissipating unit, the first terminal of the second semiconductor switch is coupled to the second terminal of the second dissipating unit and the second terminal of the second semiconductor switch is coupled to the second terminal of the third dissipating unit, and the first terminal of the third semiconductor switch is coupled to the second terminal of the third dissipating unit and the second terminal of the third semiconductor switch is coupled to the second terminal of the first dissipating unit. The trigger circuit is coupled to the gate terminals of the first, second and third semiconductor switches for switching the semiconductor switches.

According to a third aspect of the invention, a wind turbine is provided. The wind turbine comprises a generator having a plurality of output terminals corresponding to a multi-phase power output, a power converter for converting the power output from the generator, and a power dissipating arrangement for dissipating power from the generator. The power dissipating arrangement includes a plurality of dissipating units, a plurality of semiconductor switches, a trigger circuit for switching the semiconductor switches and a control unit for controlling the operation of the trigger circuit, thereby controlling the switching of the semiconductor switches.

Each dissipating unit includes a first terminal and a second terminal. The first terminal of each dissipating unit is coupled to each output terminal of the generator. Each semiconductor switch includes a first terminal, a second terminal and a gate terminal. The first terminal of each semiconductor switch is coupled to the second terminal of each dissipating unit and the second terminal of the semiconductor switch is coupled to the second terminal of another dissipating unit, such that the second terminal of each dissipating unit is coupled to the first terminal of one semiconductor switch and the second terminal of another semiconductor switch. The trigger circuit is coupled to the gate terminals of the plurality of the semiconductor switches for switching the semiconductor switches.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

A power dissipating arrangement for dissipating power from a generator in a wind turbine is provided. The generator comprises output terminals corresponding to a multi-phase output. The power dissipating arrangement comprises a plurality of dissipating units, a plurality of semiconductor switches, a trigger circuit for switching the semiconductor switches and a control unit for controlling the operation of the trigger circuit, thereby controlling the switching of the semiconductor switches.

Each dissipating unit includes a first terminal and a second terminal. The first terminal of each dissipating unit is coupled to each output terminal of the generator. Each semiconductor switches includes a first terminal, a second terminal and a gate terminal. The first terminal of each semiconductor switches is coupled to the second terminal of each dissipating unit and the second terminal of the semiconductor switch is coupled to the second terminal of another dissipating unit, such that the second terminal of each dissipating unit is coupled to the first terminal of one semiconductor switch and the second terminal of another semiconductor switch. The trigger circuit is coupled to the gate terminals of the plurality of the semiconductor switches for switching the semiconductor switches.

The generator is an electromechanical machine capable of converting mechanical energy into electrical energy. The generator used in a wind turbine could be any type of generators including but not limited to, a permanent magnet generator, a synchronous generator and a doubly-fed induction generator. The generator normally has a plurality of windings providing a multiphase power output, with each phase of the power output on each winding. Typically, a generator has a 3-phase output with each phase displaced with the other two phases by 120 degrees.

The dissipating unit includes any component suitable for dissipating power. For example, the dissipating unit may include a resistor or a bank of resistors. The current flow between the first terminal and the second terminal of the semiconductor switch is blocked. To render the semiconductor switch into a conducting state or activate the semiconductor switch, a suitable gating signal is applied to the gate terminal. This gating signal is supplied by the trigger circuit which is coupled to the gate terminals of the plurality of semiconductor switches. The semiconductor switches and the dissipating units are connected in a manner such that the second terminal of each dissipating unit is coupled to the first terminal of one semiconductor switch and the second terminal of one other different semiconductor switch. When the semiconductor switches are activated or switched on, they are in the conducting state and power from the generator is dissipated through the dissipating units.

The power dissipating arrangement according to the invention uses minimal power electronic components compared to the prior art. Specifically, only one semiconductor switch is needed for each phase. For example for a generator having a 3-phase power output, only three semiconductor switches are needed. When fewer components are used, the probability of any one of the components failing is also reduced. Accordingly, the reliability of the power dissipating arrangement is increased. As fewer components are used, there are also savings in space and cost. As will be apparent in the description later, this power dissipating arrangement also allows faulty components in the system to be identified easily and hence can be replaced in advance of the operation of the wind turbine. This reduces unnecessary turbine down-time.

According to an embodiment, the semiconductor switches comprise thyristors, insulated gate bipolar transistors (IGBT) or metal oxide semiconductor field-effect transistors (MOSFET). A thyristor comprises an anode, a cathode and a gate terminal. The anode and cathode of the thyristor correspond to the first terminal and second terminal of the semiconductor switch, respectively. An IGBT comprises a collector, an emitter and a gate terminal. The collector and emitter of the IGBT correspond to the first terminal and second terminal of the semiconductor switch, respectively. A MOSFET comprises a drain, a source and a gate terminal. The drain and source of the MOSFET correspond to the first terminal and second terminal of the semiconductor switch, respectively.

It should be noted that other types of semiconductor switches, such as silicon controlled rectifiers (SCR), bipolar junction transistors (BJT), MOS controlled thyristors (MCT), gate turn-off thyristors (GTO), etc, may be used in other embodiments.

According to an embodiment, the control unit controls the operation of the trigger circuit based on inputs obtained from at least one of voltage at the first or second terminals of the dissipating units, current at the output terminals of the generator, temperature of the dissipating units and a shut down signal. The control unit should not be limited to obtaining inputs only from these four sources of inputs mentioned in this embodiment. The control unit can also receive inputs from other sources to decide whether the semiconductor switches should be turned on. For example, the control unit may turn on the semiconductor switches based on grid voltages or based on instruction from an operator of the wind turbine.

According to an embodiment, the wind turbine comprises a turbine control, and wherein the control unit is configured to cause the trigger circuit to turn on the semiconductor switches when the control unit detected a shut down signal from the turbine control, thereby causing the power from the generator to be dissipated through the power dissipating units. The turbine control may be a central controller in the wind turbine for controlling the overall operation of the turbine, a safety controller for ensuring the safe operation of the turbine or any distributed controllers for performing any control functions. When the turbine control determines that the turbine should shut down, for example due to unacceptable loadings of turbine components or unfavorable wind conditions, it sends out a shut down signal to initiate a shut down process. When such a shut down signal is received by the control unit, the semiconductor switches are activated to dissipate the power from the generator.

According to an embodiment, the power dissipating arrangement further comprises a voltage measurement unit, wherein the voltage measurement unit is configured to measure the voltages at the second terminal of the dissipating units. The voltages at the second terminals of the dissipating units correspond to the output voltage of the generator. If the semiconductor switches are in the conducting state, the voltages at the second terminal of the dissipating units are zero. It should be noted that it is also possible to measure the voltages at the first terminals of the dissipating units in an alternative embodiment.

According to an embodiment, the control unit is configured to cause the trigger circuit to turn on the semiconductor switches to dissipate power from the generator through the dissipating units when the measured voltages exhibit a predetermined voltage characteristic. According to a further embodiment, the predetermined voltage characteristic comprises at least one of asymmetry in the measured voltages and at least one of the measured voltages is outside a predetermined range.

The voltage at each output terminal (line voltage) is measured (or monitored) and processed. Monitoring of the line voltages includes but not limited to filtering the voltages, determining the root-mean-square (rms) of the voltages, summing and averaging the voltages, and observing the asymmetry in the voltages. If there is significant asymmetry in the measured voltages, this may indicate that generator is generating asymmetrical voltages, one or more semiconductor switches are in a conducting state or any other associated component is faulty. Accordingly, the semiconductor switches are turned on by the control unit. The control unit may also turn on the semiconductor switches when it is detected that one of the measured voltages is too low or too high, i.e. outside a predetermined range. If one of the measured voltages is too low, for example near zero, this may indicate that one of the components is faulty. Accordingly, the turbine is shut down and the semiconductor switches are switched on to dissipate the generator power. Therefore, the embodiment ensures when there is a fault in the generator or the semiconductor switches, the wind turbine is shut down and the dissipating unit is activated to dissipate the power from the generator.

According to an embodiment, the power dissipating arrangement further comprises a current measurement unit, wherein the current measurement unit is configured to measure the current at a plurality of input terminals of a power converter coupled to the output terminals of the generator. By measuring the current at the power converter inputs, the health of the converter can be monitored.

According to an embodiment, the control unit is configured to cause the trigger circuit to turn on the semiconductor switches to dissipate power from the generator through the dissipating units when the measured currents exhibit a predetermined current characteristic. According to a further embodiment, the predetermined current characteristic comprises at least one of asymmetry in the measured currents, and at least one of the measured currents is outside a predetermined range.

Similarly, the current at each input terminal (line current) is measured or monitored. Monitoring of the line currents include but not limited to filtering the currents, determining the root-mean-squared of the currents, summing and/or averaging the currents, observing the asymmetry in the measured currents. If there is significant asymmetry in the currents or one of the measured currents is too low or too high, this may indicate that the converter is faulty or any other associated component is faulty. Accordingly, the semiconductor switches are turned on by the control unit to dissipate the generator power.

According to an embodiment, the power dissipating arrangement further comprises a health monitoring unit, wherein the health monitoring unit is configured to determine a health status of the power dissipating arrangement during a testing phase of the wind turbine by:

obtaining a first voltage measurement from the voltage measurement unit;

determining the status of the generator based on the first voltage measurement;

controlling the controller unit to turn on the semiconductor switches for a predefined period of time;

obtaining a second voltage measurement from the voltage measurement unit; and determining the status of the semiconductor switches and the trigger circuit based on the second voltage measurement.

In this embodiment, the health status of the power dissipating arrangement and/or the generator is determined. The determining of the health status may be performed during the startup phase of the wind turbine or while during the commissioning of the turbine drive train in a factory. At this stage, the power converter is normally disconnected from the generator e.g. by circuit breakers. According to the embodiment, it is thus possible to determine the health status of the generator and also of the other components of the power dissipating arrangement. This allows any faulty components to be identified at an early stage, and replacement arrangement can be made easily. This ensures a reliable system during the operation of the wind turbine. The continual monitoring of the generator and converter during the operation of the wind turbine also ensures the robustness of the system.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
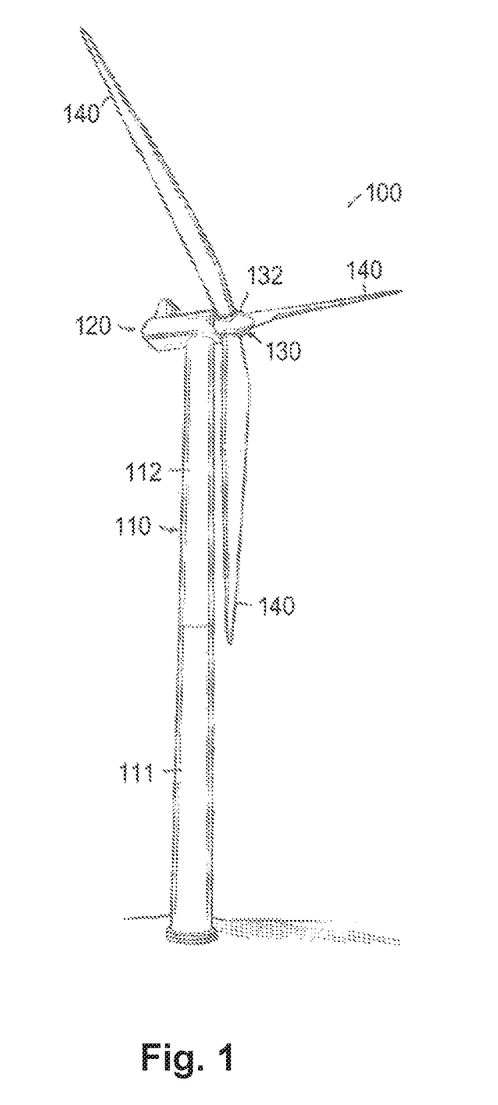
FIG. 1 shows a general structure of a wind turbine.

FIG. 1 illustrates an exemplary wind turbine 100 according to an embodiment. As illustrated in FIG. 1, the wind turbine 100 includes a tower 110, a nacelle 120, and a rotor 130. In one embodiment, the wind turbine 100 may be an onshore wind turbine. However, embodiments of the invention are not limited only to onshore wind turbines. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of the wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 140 further comprises mechanisms (not shown) for adjusting the pitch of the blade 140 to increase or reduce the amount of wind energy captured by the blade 140. Pitching adjusts the angle at which the wind strikes the blade 140. It is also possible that the pitch of the blades 140 cannot be adjusted. In this case, the aerodynamic profile of the blades 140 is designed in a manner that the lift experienced by the blades are lost when the wind speed exceeded a certain threshold, causing the turbine to stall.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the wind turbine 100 shown in FIG. 1 has three blades 140, it should be noted that a wind turbine may have different number of blades. It is common to find wind turbines having two to four blades. The wind turbine 100 shown in FIG. 1 is a Horizontal Axis Wind Turbine (HAWT) as the rotor 130 rotates about a horizontal axis. It should be noted that the rotor 130 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 140 in the rotor 130.

Figure 2:
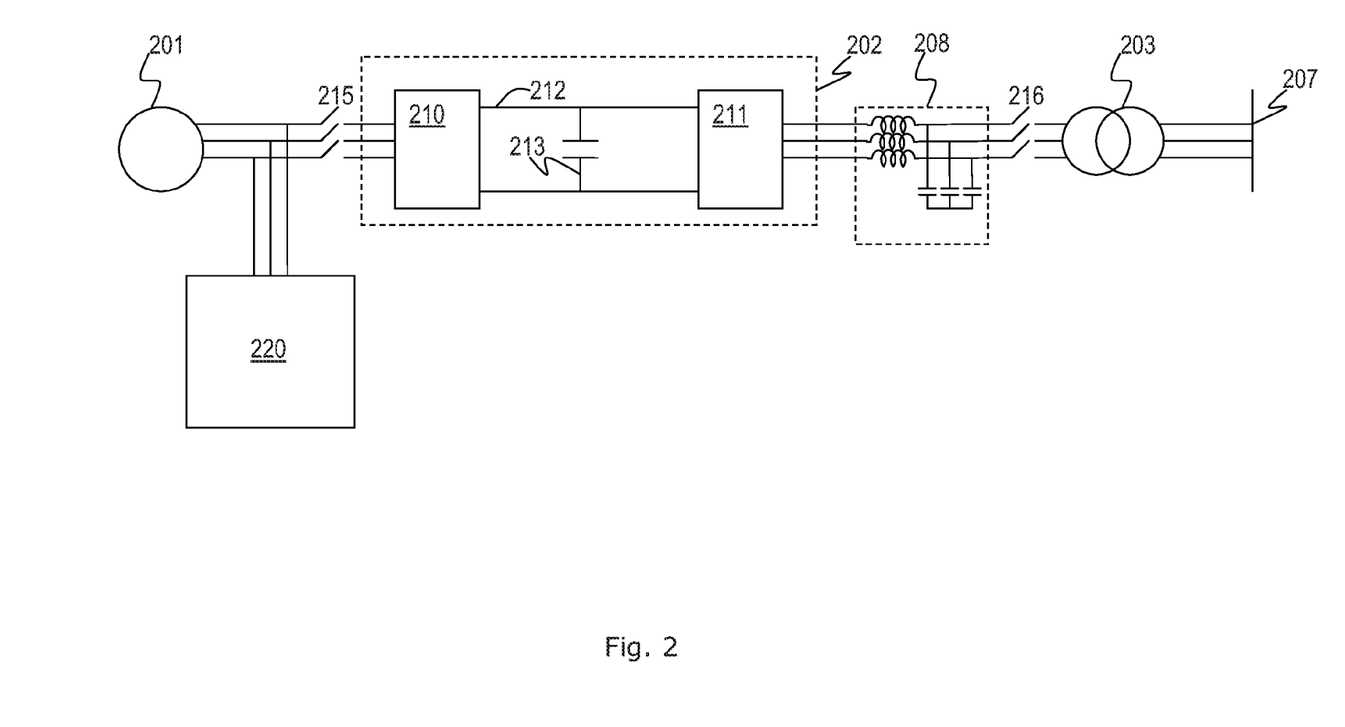
FIG. 2 shows an electrical system layout of the wind turbine.

FIG. 2 shows an electrical system of the wind turbine having a power dissipating arrangement 220 according to an embodiment. The electrical system includes a generator 201, a power converter 202 and a main transformer 203. The electrical system is connected to a power grid 207. The power converter 202 includes a generator-side converter 210 and a grid-side converter 211 connected via a direct current (DC) link 212. The DC-link 212 includes a DC-link capacitor 213. The power dissipating arrangement 220 is connected to the output of the generator 201. The electrical system also include grid-side filters 208 (also known as grid harmonic filter) for filtering switching harmonics, generator-side breaker 215 between the generator 201 and the power converter 202, and grid-side breaker 216 between the filters 208 and the transformer 203.

The generator 201 converts mechanical energy or power to electrical energy or power having AC voltage and current (collectively referred to as "AC signals"), and provides the generated AC signals to the generator-side converter 210. The AC signals from the generator have a variable frequency, due to varying wind. The generator-side converter 210 converts or rectifies the AC signals to DC voltage and current (collectively know as "DC signals"). The grid-side converter 211 converts the DC signals from the DC-link 212 into fixed frequency AC signals for the power grid 207. The voltage of the fixed frequency AC signals at the output of the grid-side converter 211 is stepped up by the main transformer 203. The power dissipating arrangement 220 connected to the output of the generator 201 is adapted to dissipate power from the generator 201. The structure of the power dissipating arrangement 220 will be explained in greater detail later.

It should be noted that FIG. 2 is only an illustration of an electrical system in a wind turbine where only common components are shown. The electrical system may include other components such as generator-side filters, sensors, DC-link voltage pre-charge arrangement, resonant filter, etc.

Figure 3:
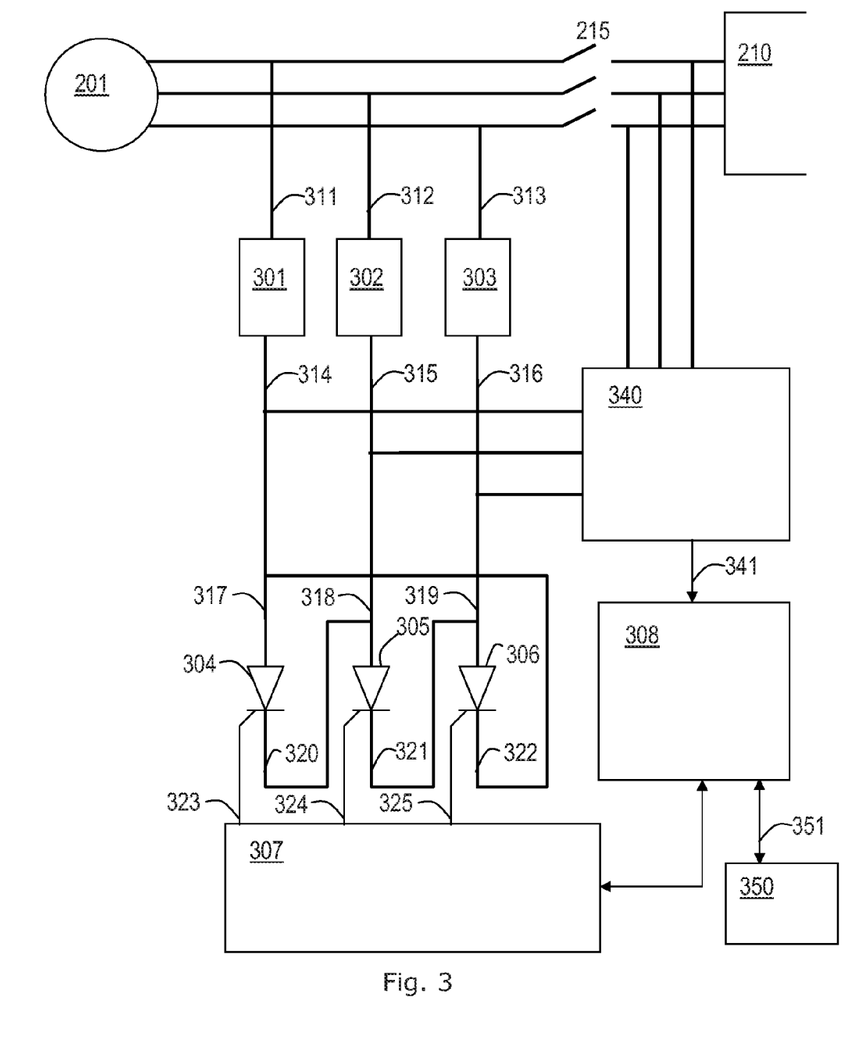
FIG. 3 shows an exemplary power dissipating arrangement in the wind turbine according to an embodiment.

FIG. 3 illustrates the power dissipating arrangement 220 according to an embodiment. The power dissipating arrangement 220 includes a first resistor 301, a second resistor 302, a third resistor 303, a first thyristor 304, a second thyristor 305, a third thyristor 306, a trigger circuit 307 and a control unit 308. Each of the first, second and third resistor 301, 302, 303 includes a first terminal 311, 312, 313 and a second terminal 314, 315, 316. Each thyristor 304, 305, 306 includes an anode 317, 318, 319, a cathode 320, 321, 322 and a gate terminal 323, 324, 325.

The first terminal 311 of the first resistor 301 is coupled to the first output winding of the generator 201, and the second terminal 314 is coupled to the anode 317 of the first thyristor 304. The first terminal 312 of the second resistor 302 is coupled to the second output winding of the generator 201, and the second terminal 315 is coupled to the anode 318 of the second thyristor 305. The first terminal 313 of the third resistor 303 is coupled to the third output winding of the generator 201, and the second terminal 316 is coupled to the anode 319 of the third thyristor 306. The cathode 320 of the first thyristor 304 is coupled to the anode 318 of the second thyristor 305 (or the second terminal 315 of the second resistor 302). The cathode 321 of the second thyristor 305 is coupled to the anode 319 of the third thyristor 306 (or the second terminal 316 of the third resistor 303). The cathode 322 of the third thyristor 306 is coupled to the anode 317 of the first thyristor 304 (or the second terminal 314 of the first resistor 301). The gate terminal 323, 324, 325 of the first, second and third thyristors 304, 305, 306 are coupled to the trigger circuit 307.

The control unit 308 is coupled to the trigger circuit 307. As mentioned earlier, current flow between the anode and the cathode is blocked. To render the thyristor into a conducting state or activate the thyristor, a gating signal is applied to the gate terminal by the trigger circuit 307. The thyristor can be said to be switched/turned on when it is in the conducting state. The control unit 308 controls the operation of the trigger circuit 307, and hence controls the switching or activation of the thyristors 304, 305, 306. A common type of thyristor is silicon controlled rectifier (SCR).

The control unit 308 may obtain input from various sources to determine whether to activate the thyristors 304, 305, 306, including but not limited to signal from turbine control 350, voltage at the generator output, current at the converter 210 input and temperature of the resistors 301, 302, 303. According to an embodiment, the power dissipating arrangement 220 includes a measurement circuit 340 for obtaining voltage and current information. As an example, the measurement circuit 340 receives the voltage at the second terminals 314, 315, 316. Additionally or alternatively, the measurement circuit 340 receives the current at the input of the converter 210, or more generally at a point between the output of the generator 201 and the input of the converter 210. The measurement circuit 340 provides an output signal 341 to the control unit 308. The control unit 308 also receives a control signal 351, for example a shut down signal, from the turbine control 350. Based on the output signal 341 from the measurement circuit 340 and/or the control signal 351 from the turbine control 350, the control unit 308 controls the operation of the thyristors 304, 305, 306 through the trigger circuit 307, thereby dissipating power from the generator through the resistors 301, 302, 303.

It should be noted that the resistors 301, 302, 303 may be a single resistor or a resistor bank comprising a plurality of resistors. The resistors 301, 302, 303 might also be replaced with other components suitable for dissipating power. The measurement circuit 340 is an optional component in the power dissipating arrangement 220, depending on what input the control unit 308 is configured to receive to control the operation of the thyristors. In an embodiment, the control unit 308 controls the operation of the thyristors based on temperature of the resistors 301, 302, 303. In this embodiment, the measurement circuit 340 may be configured to measure the temperature of the resistors 301, 302, 303.

As mentioned earlier, the power dissipating arrangement for a 3-phase generator comprises only three thyristors. Accordingly, the number of components used has been reduced compared to the prior art. This increases the reliability of power dissipating arrangement because the probability of any one of the components failing is reduced. According to the embodiment, it is also possible to determine which of the components of the power dissipating arrangement is faulty.

It should be noted that thyristors are used as the semiconductor switches in this example shown in FIG. 3. It is also possible to use other semiconductor switches such as IGBTs, MOSFETs, etc, in other embodiments.

A method for determining the health status of the power dissipating arrangement according to an embodiment shall now be described with reference to FIG. 3. The health status check of the power dissipating arrangement may be done any time, but usually during the starting up of the wind turbine when the generator is rotating but the power converter 202 is disconnected from the generator 201 by the generator-side breaker 215. At this stage, the voltages at the second terminal of the resistors 301, 302, 303 are measured by the measurement circuit 340. The measured voltages are further processed and analyzed to determine the health of the generator. Further processing includes filtering the voltages, determining the root-means-square (rms) of the voltages, summing and/or averaging the voltages, etc. The voltages are then analyzed. Analysis of the voltages includes observing the asymmetry of the measured voltages. If the asymmetry of the measured voltages exceeds a certain threshold (i.e. there is significant asymmetry in the voltages), it means that there could be problems with the generator. For example, the sum of the line voltages is determined. The sum of the line voltages should be approximately zero or is very low for a healthy generator. If the sum of the line voltages is not approximately zero, the generator is possibly faulty. The health status of the generator may also be determined from the rms values of the measured voltages.

After determining the health of the generator, the thyristors are turned on for a short period of time e.g. 10-50 ms. When the thyristors are turned on, the measurement unit 340 measures the voltages at the second terminal of the resistors 301, 302, 303. If any of the measured voltages are not zero, the corresponding thyristor and/or associated circuit (e.g. the trigger circuit) is potentially faulty. If no faults are detected in the generator, the thyristors and the associated circuit, the converter 210 is connected to the generator 201 via the generator-side breakers 215 to start the operation of the wind turbine.

It should be noted that the steps for determining the health status of the power dissipating arrangement may be reversed in an alternative embodiment. In this alternative embodiment, the thyristors are first turned on for a short period of time to determine the health status of the thyristors and the associated circuits (e.g. the trigger circuit). Subsequently, the thyristors are turned off and the health status of the generator is determined.

The method for performing health check can be performed by a health monitoring unit (not shown). The health monitoring unit may be part of the control unit 308 or the turbine controller 350. This health status check of the power dissipating arrangement is simple and can be done quickly. By detecting generator, thyristor and other associated circuit (e.g. trigger circuit) faults during the start up or testing phase, any faulty components can be replaced early. This is advantageous over the prior art where the faulty thyristor, generator and/or other components are only discovered later when the turbine is in operation, resulting in further damage or unnecessary turbine down time and possibly unscheduled visit by a service technician to replace the faulty components. The faulty components in the power dissipating arrangement may also result in damage of other components in the wind turbine when in operation. According to the embodiment, all these problems are avoided.

During operation of the wind turbine, the power dissipating arrangement 220 monitors the status of the generator or the power converter, and activates the thyristors 304, 305, 306 to dissipate the power from the generator 201 if it has detected a fault in the generator or the converters. In an embodiment, the measurement unit 340 measures the voltages at the second terminal 314, 315, 316 of the resistors 301, 302, 303. If the voltages measured by the measurement unit 340 are significantly asymmetrical (outside a predetermined limit) and/or if one of the line voltages is approximately zero or is very low, it means that the generator, one or more of the thyristors or its associated circuit is faulty. Accordingly, the control unit 308 turns on the thyristors 304, 305, 306. For example, if the voltage measured between the second terminal 315 of the second resistor 302 and second terminal 314 of the first resistor 301 is near to zero signifying a fault in the thyristor or its associated circuit, the control unit 308 activates all the thyristors 304, 305, 306 to dissipate power from the generator 201.

In another embodiment, the measurement unit 340 measures the currents at the input terminals of the generator-side converter 210. If the currents measured by the measurement unit 340 are significantly asymmetrical and/or if one of the line currents is outside a predetermined range (i.e. too high or too low), it means that the converter 210 or associated circuit is faulty. Accordingly, the control unit turns on the thyristors 304, 305, 306. For example, if the current measured at the third input terminal of the converter 210 is much higher than a predetermined current threshold, the control unit 308 activates all the thyristors 304, 305, 306 to dissipate power from the generator 201. Similarly, if asymmetry in the measured currents is more than a predetermined limit, then at least one of the components in the system is faulty and the thryistors are turned on. Further investigations may need to be made before the operation can be continued. Depending on the nature of the faults, it may also be necessary to open the generator-side breakers 215 to prevent further damage to the converter and other components. The controls for the converter may also be stopped.

In an embodiment, the control unit 308 activates the thyristors 304, 305, 306 to dissipate power from the generator 201 when it receives a shut down signal 351 from the turbine control 350. The wind turbine may be requested to shut down, for example due to a supervision alert, extreme wind conditions, component failures or for other safety related reasons. When the turbine is requested to shut down, a shut down signal is usually sent by the turbine controller 350 to various components in the wind turbine to ate shut down operation. When the control unit 308 receives the shut down signal 351, it switches on the thyristors 304, 305, 306.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

What is claimed is:

1. A power dissipating arrangement for dissipating power from a wind turbine, wherein the wind turbine comprises a turbine control unit and a generator comprising a plurality of output terminals corresponding to a multi-phase output, the power dissipating arrangement comprises:
   a plurality of dissipating units, each dissipating unit having a first terminal and a second terminal, wherein the first terminal of each dissipating unit is coupled to each output terminal of the generator;
   a plurality of semiconductor switches, each semiconductor switch having a first terminal, a second terminal and a gate terminal, wherein the first terminal of each semiconductor switch is coupled to the second terminal of each dissipating unit and the second terminal of the semiconductor switch is coupled to the second terminal of another dissipating unit, such that the second terminal of each dissipating unit is coupled to the first terminal of one semiconductor switch and the second terminal of another semiconductor switch;
   a trigger circuit coupled to the gate terminals of the plurality of the semiconductor switches for switching the semiconductor switches;
   a first control unit for controlling the operation of the trigger circuit, thereby controlling the switching of the semiconductor switches, wherein the first control unit is configured to cause the trigger circuit to turn on the semiconductor switches when the first control unit detects a shutdown signal from the turbine control, thereby causing power from the generator to be dissipated through the power dissipating units; and
   a health monitoring unit configured to determine a health status of the power dissipating arrangement during a testing phase of the wind turbine by:
      obtaining a first voltage measurement from a voltage measurement unit,
      determining a health status of the generator based on the first voltage measurement,
      controlling the first control unit to turn on the semiconductor switches for a predefined period of time,
      obtaining a second voltage measurement from the voltage measurement unit, and
      determining a health status of the semiconductor switches and the trigger circuit based on the second voltage measurement.

2. The power dissipating arrangement according to claim 1, wherein the plurality of semiconductor switches comprise at least one of thyristors, insulated gate bipolar transistors (IGBT), and metal oxide semiconductor field-effect transistors (MOSFET).

3. The power dissipating arrangement according to claim 1, wherein the first control unit controls the operation of the trigger circuit based on inputs obtained from at least one of a voltage at the first terminal of at least one of the plurality of dissipating units, a voltage at the second terminal of at least one of the plurality of dissipating units, current of at least one of the output terminals of the generator, temperature of at least one of the plurality of dissipating units, and a shut down signal.

4. The power dissipating arrangement according to claim 1, wherein the voltage measurement unit is configured to measure voltages at the second terminals of the dissipating units.

5. The power dissipating arrangement according to claim 4, wherein the first control unit is configured to cause the trigger circuit to turn on the semiconductor switches to dissipate power from the generator through the dissipating units when the measured voltages exhibit a predetermined voltage characteristic.

6. The power dissipating arrangement according to claim 5, wherein the predetermined voltage characteristic comprises at least one of:
   asymmetry in the measured voltages; and
   at least one of the measured voltages is outside a predetermined range.

7. The power dissipating arrangement according to claim 1, further comprising a current measurement unit, wherein the current measurement unit is configured to measure respective currents at a plurality of input terminals of a power converter coupled to the output terminals of the generator.

8. The power dissipating arrangement according to claim 7, wherein the first control unit is configured to cause the trigger circuit to turn on the semiconductor switches to dissipate power from the generator through the dissipating units when the measured currents exhibit a predetermined current characteristic.

9. The power dissipating arrangement according to claim 8, wherein the predetermined current characteristic comprises at least one of:
   asymmetry in the measured currents; and
   at least one of the measured currents is outside a predetermined range.

10. The power dissipating arrangement according to claim 1, wherein at least one of the plurality of dissipating units is at least one of a resistor and a bank of resistors.

11. The power dissipating arrangement according to claim 1, wherein the trigger circuit turns on at least one of the semiconductor switches by providing a gating signal.

12. A power dissipating arrangement for dissipating power from a wind turbine, wherein the wind turbine comprises a turbine control unit and a generator comprising a first, second and third output terminal corresponding to a three-phase output, the power dissipating arrangement comprises:
   a first, second and third dissipating unit, each dissipating unit having a first terminal and a second terminal, wherein
      the first terminal of the first dissipating unit is coupled to the first output terminal of the generator, the first terminal of the second dissipating unit is coupled to the second output terminal of the generator, and the first terminal of the third dissipating unit is coupled to the third output terminal of the generator;

a first, second and third semiconductor switches, each semiconductor switch having a first terminal, a second terminal and a gate terminal, wherein the first terminal of the first semiconductor switch is coupled to the second terminal of the first dissipating unit and the second terminal of the first semiconductor switch is coupled to the second terminal of the second dissipating unit, the first terminal of the second semiconductor switch is coupled to the second terminal of the second dissipating unit and the second terminal of the second semiconductor switch is coupled to the second terminal of the third dissipating unit, the first terminal of the third semiconductor switch is coupled to the second terminal of the third dissipating unit and the second terminal of the third semiconductor switch is coupled to the second terminal of the first dissipating unit;

a trigger circuit coupled to the gate terminals of the first, second and third semiconductor switches for switching the semiconductor switches;

a first control unit for controlling the operation of the trigger circuit, thereby controlling the switching of the semiconductor switches, wherein the first control unit is configured to cause the trigger circuit to turn on the semiconductor switches when the first control unit detects a shut down signal from the turbine control unit, thereby causing power from the generator to be dissipated through the power dissipating units; and a health monitoring unit configured to determine a health status of the power dissipating arrangement during a testing phase of the wind turbine by:

obtaining a first voltage measurement from a voltage measurement unit, determining a health status of the generator based on the first voltage measurement, controlling the first control unit to turn on the semiconductor switches for a predefined period of time, obtaining a second voltage measurement from the voltage measurement unit, and determining a health status of the semiconductor switches and the trigger circuit based on the second voltage measurement.

13. The power dissipating arrangement according to claim 12, wherein the plurality of semiconductor switches comprise at least one of thyristors, insulated gate bipolar transistors (IGBT), and metal oxide semiconductor field-effect transistors (MOSFET).

14. The power dissipating arrangement according to claim 12, wherein the voltage measurement unit is configured to measure voltages at the second terminal of the dissipating units.

15. A wind turbine comprising:

a generator comprising a plurality of output terminals corresponding to a multi-phase power output;

a turbine control unit;

a power converter for converting the power output from the generator; and a power dissipating arrangement for dissipating power from the generator, wherein the power dissipating arrangement comprises:

a plurality of dissipating units, each dissipating unit having a first terminal and a second terminal, wherein the first terminal of each dissipating unit is coupled to each output terminal of the generator, a plurality of semiconductor switches, each semiconductor switch having a first terminal, a second terminal and a gate terminal, wherein the first terminal of each semiconductor switch is coupled to the second terminal of each dissipating unit and the second terminal of the semiconductor switch is coupled to the second terminal of another dissipating unit, such that the second terminal of each dissipating unit is coupled to the first terminal of one semiconductor switch and the second terminal of another semiconductor switch, a trigger circuit coupled to the gate terminals of the plurality of the semiconductor switches for switching the semiconductor switches, a first control unit for controlling the operation of the trigger circuit, thereby controlling the switching of the semiconductor switches, wherein the first control unit is configured to cause the trigger circuit to turn on the semiconductor switches when the first control unit detects a shut down signal from the turbine control unit, thereby causing power from the generator to be dissipated through the power dissipating units, and a health monitoring unit configured to determine a health status of the power dissipating arrangement during a testing phase of the wind turbine by:

obtaining a first voltage measurement from a voltage measurement unit, determining a health status of the generator based on the first voltage measurement, controlling the first control unit to turn on the semiconductor switches for a predefined period of time, obtaining a second voltage measurement from the voltage measurement unit, and determining a health status of the semiconductor switches and the trigger circuit based on the second voltage measurement.

\* \* \* \* \*